Sept. 13, 1932.  J. R. COLE  1,877,268
STUFFING BOX AND PACKING THEREFOR
Filed May 9, 1931    2 Sheets-Sheet 1
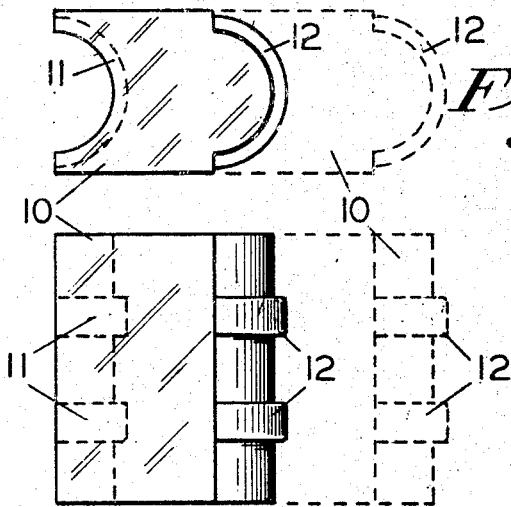
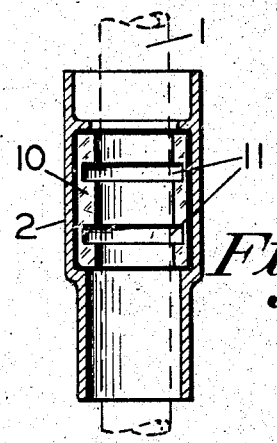
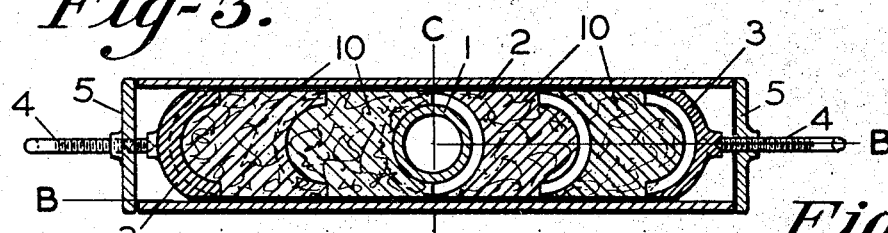
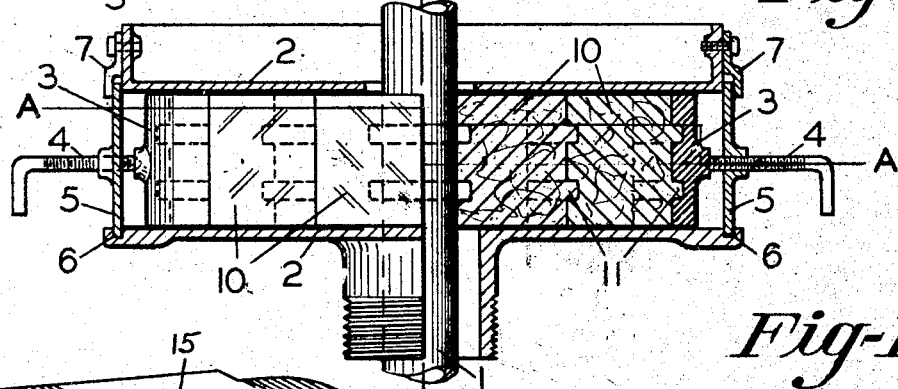
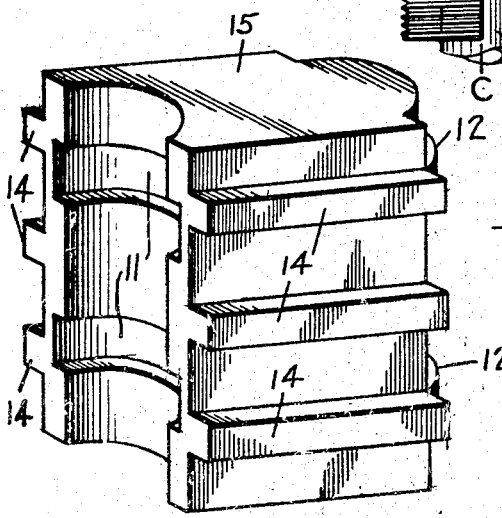
James R. Cole
INVENTOR Sept. 13, 1932.   J. R. COLE   1,877,268
STUFFING BOX AND PACKING THEREFOR
Filed May 9, 1931   2 Sheets-Sheet 2

James R. Cole
INVENTOR

Patented Sept. 13, 1932

1,877,268

UNITED STATES PATENT OFFICE

JAMES R. COLE, OF TULSA COUNTY, OKLAHOMA

STUFFING BOX AND PACKING THEREFOR

Application filed May 9, 1931. Serial No. 536,181.

My invention relates to stuffing boxes and packing therefor, primarily for oil wells but capable of other use, of the type using packing elements opposed to each other and arranged about the polished rod or other reciprocating element against which it is desired to pack off; and has for its object to provide packing elements which are adapted to be inserted into the packing box one behind the other, the succeeding packing elements in turn coming in contact with the polished rod as its predecessor is used up, to the effect that the entire packing elements may be used, nor any part thereof wasted as in the present form, and further that the old packing element which has become worn, will not need to be taken out of the box to replenish the packing therein.

A further object is to provide a stuffing box suitable to take such form of packing, and another object is to provide the packing elements in such form that they will resist the pressure and friction when the element in contact with the polished rod is worn thin and when it and its immediate successor, or parts of both elements, are in contact with the polished rod, at which time there is a tendency for the remaining part of the old element to be ejected from the box or to permit the fluid to leak between the packing elements.

Another object is to provide the packing elements in form whereby no element of a different design need first be inserted into the box to be then followed by the regular packing element. In my applications for Letters Patent now pending under Serial Nos. 444,697 filed April 16, 1930, and 452,602 filed May 15, 1930, I show certain stuffing boxes which are adapted with or without certain modifications here shown, to be employed for use with the form of packing element named herein as being of the interlocking type, and I also show therein packing elements which may follow behind each other in the box, but the packing elements herein disclosed are adapted to use with higher pressures nor need a starter element or originally inserted element of a different design, be used.

The improved packing elements hereunder consideration are provided with either interlocking tongues and grooves in their front and rear surfaces, which when two of such elements interlock with each other under compression in the box, makes the two elements the same as one element so far as its packing effect is concerned, and in effect the two are made as one element to all intents and purposes; or with side ridges or tongues which fit into corresponding grooves in the sides of the stuffing box; or with both the front and rear grooves and the side ridges; or by single grooves and ridges as aforesaid instead of a plurality thereof; or by a ridge or ridges in the sides of the stuffing box without the packing elements having any corresponding grooves therefor but with the ridges biting into the sides of the packing elements; all of which is new in the art.

With the above and other objects in view which will appear as the description proceeds, my invention consists in the novel features hereinafter set forth in detail, illustrated in the accompanying drawings, and more particularly pointed out in the appended claims.

Referring to the drawings, in which numerals of like character designate similar parts thruout the several views:

Fig. 1 is a view in cross section, of a stuffing box adapted to use the interlocking form of packing element, with four of such elements in place in the box, two being on either side of the polished rod and interlocking with each other, the cross section being on line B—B of Fig. 2.

Fig. 2 is a view of the same in cross section on line A—A of Fig. 1, and in both figures line C—C is the center line of the drawings.

Fig. 3 is a side view in elevation, of a packing element of the interlocking type and having grooves in its front face and ridges in its rear face, with the broken lines indicating a like form of packing element in place to its rear and interlocking with it.

Fig. 4 is a top plan view of the packing element shown in Fig. 3, with like indication of another packing element to its rear and interlocking with it.

Fig. 5 is a cross sectional view of the stuffing box on line C—C of Figs. 1 and 2, with a packing element of the design shown in Figs. 1, 2, 3 and 4, in said box and showing said packing element in front elevation and with the polished rod indicated by broken lines.

Figure 9:
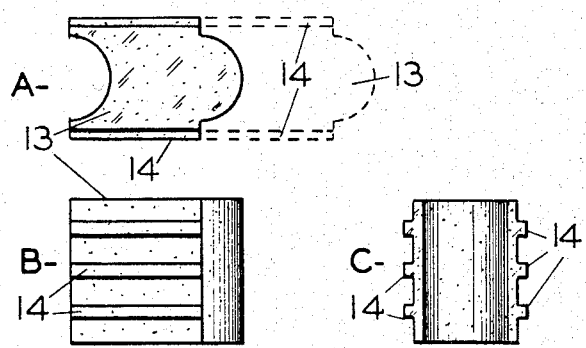
Figure 7:
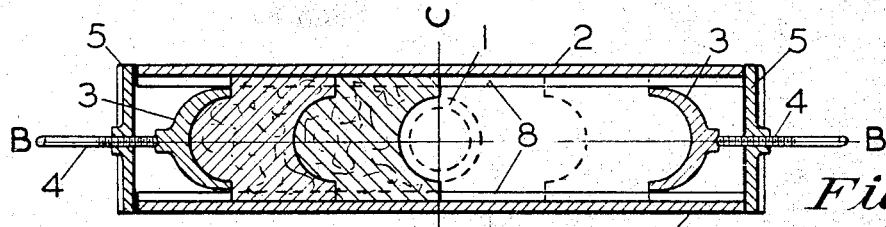
Fig. 7 is a cross sectional view of the same box on line A—A of Fig. 6, and in both Figures 6 and 7 the line C—C is the center line of the drawings.
Figure 6:
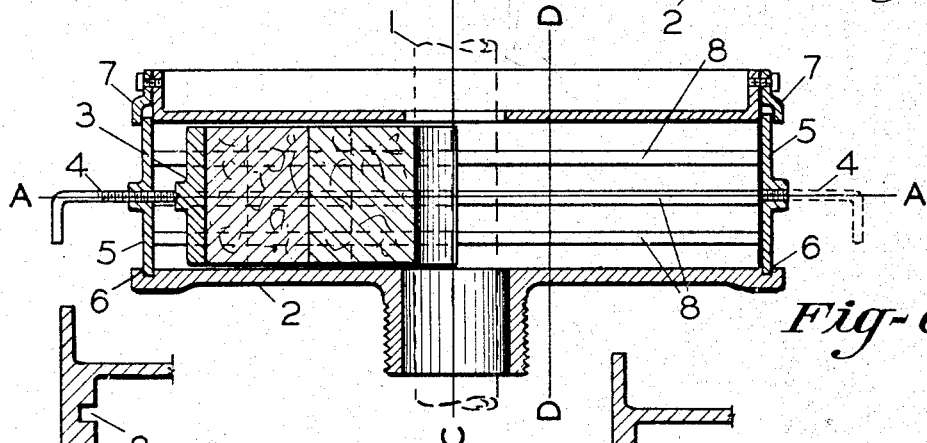
Fig. 6 is a cross sectional view on line B—B of Fig. 7, of a stuffing box such as is shown in Figs. 1 and 2 but having grooves in its sides; and showing two packing elements therein having ridges on their sides corresponding to the grooves in said box.

Fig. 9 comprises three views of a packing element having ridges on its sides which correspond to the side grooves in the box shown in Figs. 6 and 7, and without said packing element being provided with the front and rear grooves and ridges as is the packing element shown in Figs. 3 and 4, with a top plan view A of the element and broken lines indicating another like element to its rear and in contact with it; a view B in side elevation; and a view C in front elevation.

Figure 10:
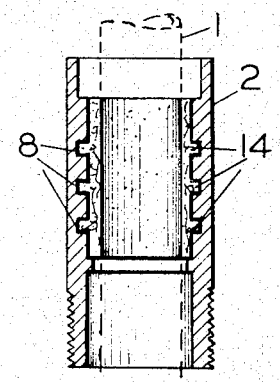

Fig. 10 is a view in cross section on line C—C of Figs. 6 and 7, of the stuffing box having the side grooves mentioned, and showing a packing element as in Fig. 9 therein in front elevation.

Figure 8:
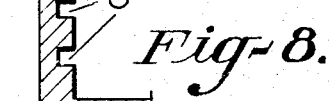
Fig. 8 is a partial cross sectional view of the box on line D—D of Fig. 6.
Figure 11:
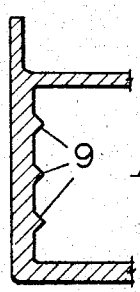

Fig. 11 is a view in cross section such as is shown in Fig. 8 but without the side grooves and having in their stead projecting ridges with which to grip the packing elements in proximity to the polished rod, and designed for use with packing elements such as are shown in Fig. 3.

Fig. 12 is a view in perspective of a packing element having front recesses and rear ridges and also having side ridges.

In the drawings, 1 represents the polished rod, 2 the body portion of a stuffing box adapted to use packing elements such as are mentioned, 3 the compression follower with its face contoured to conform with the rear surface of such packing element as may be at the time in said box, which compression follower is attached to the compression screw 4 which is threaded into a removable breech block 5 held on said body portion of the box by means of a shoulder 6 thereon and a latch 7.

8 represents the grooves in the sides of the stuffing box and located in proximity to the polished rod, the same being in the type of box shown in Figs. 6 and 7 wherein the form of packing shown in Fig. 9 is used. 9 represents ridges in the sides of a stuffing box which employs such ridges therein instead of the grooves 8 thus being adapted to take the form of packing element shown in Figs. 3 and 4, to further secure such packing elements against pressure and friction tending to eject them from the box or to permit the passage of fluid between them.

10 represents a packing element of the interlocking type having a groove or grooves in its front face which face is contoured to conform with the polished rod and having corresponding ridge or ridges in its rear face which are positioned and adapted to enter the groove or grooves, with 11 representing the groove mentioned and 12 the ridge or tongue.

13 represents a packing element of the non-interlocking type but which has side ridges on it to assist in holding it in the box, with 14 representing the side ridges in the packing element which are positioned and adapted to fit into the grooves 8.

15 represents a packing element of the interlocking type with grooves 11 and ridges 12 thereon, and also having side ridges 14 on either side thereof.

In operation in a box of the kind shown, two of the packing elements are placed in the box, one on either side of the polished rod. Obviously the same kind of packing elements could be used in any kind of stuffing box wherein said elements are arranged opposed to each other about the polished rod. When said packing elements become partially worn another like packing element is placed in the box to the rear of the worn element or elements. When the first element is worn until its successor is in contact with the polished rod, the interlocking tongues and grooves characteristic of the elements shown in Figs. 3 and 4, if such are the elements used, prevent the fluid from leaking by the packing and prevent the worn element or parts thereof from being ejected from the box by the pressure or the friction of the polished rod. If the packing element mentioned also has on it the side ridges 14 and the box used has grooves 8, the packing elements are held more firmly in the box; or if elements such as shown in Figs. 3 and 4 are used in a box containing the ridges 9, the ridges also assist in holding the packing in place.

Packing elements such as are shown in Fig. 9 will not resist as great a pressure nor as great a polished rod friction as the interlocking type shown in Figs. 3 and 4, but sufficiently resist the ordinary pressure and friction on an oil well. It would further appear that one tongue and groove instead of a plurality thereof would be adequate to hold low pressures, but elements having a plurality thereof are preferable. Moreover the last named type would be preferred for use on oil savers where a wire line is employed instead of a smooth polished rod, it being understood that the term polished rod as used herein is also applicable to a wire line used in lieu thereof or any acceptable reciprocating element against which it may be desired to pack off a fluid.

Having thus fully disclosed my invention, what I claim and desire to secure by Letters Patent, is:

1. A packing element adapted to use in a stuffing box wherein a plurality of packing elements are arranged opposed to one another about the reciprocating element passed thru the stuffing box and against which said packing elements pack off in said stuffing box; a transverse groove in the front surface of said packing element and a ridge in the rear surface of said packing element and with said ridge positioned and adapted to enter into a corresponding groove in another similar packing element when the two are placed one behind the other in the stuffing box.

2. A packing element adapted to use in a stuffing box wherein a plurality of packing elements are arranged opposed to each other about a reciprocating element passed thru said box and against which said packing elements pack off in said box; means provided on said packing element for interlocking one of said packing elements with another of said packing elements against the action of said reciprocating element mentioned and against the pressure of the fluid to be confined by said packing elements in said stuffing box; a ridge on either side of said packing element positioned transversely thereon with reference to the position of the reciprocating element against which it is designed to pack off, and with said ridge located thereon and adapted to enter a corresponding groove in the stuffing box in which said packing element is to be used.

3. A packing element adapted to use in a stuffing box wherein a plurality of packing elements are arranged opposed to one another about the reciprocating element passed thru the stuffing box and against which said packing elements pack off in said stuffing box, a transverse groove in the front face thereof; a transverse ridge on the rear face thereof and positioned and adapted to enter a corresponding groove on another similar packing element when the two elements mentioned are placed one behind the other in the stuffing box; a transverse ridge on either side of said packing element and positioned and adapted to enter a corresponding groove in the stuffing box in which said packing element is designed to be used.

4. A packing element adapted to use in a stuffing box wherein a plurality of packing elements are arranged opposed to one another about the reciprocating element passed thru the stuffing box and against which said packing elements pack off in said stuffing box; a transverse ridge on either side of said packing element and positioned and adapted to enter a corresponding groove in the stuffing box in which said packing element is designed to be used.

5. A stuffing box adapted to receive a reciprocating element passed therethru and with said stuffing box having a packing chamber adapted to the use of packing elements substantially as shown herein and arranged opposed to one another about the reciprocating element passed thru said stuffing box; a groove in the side walls of said packing chamber, said groove being positioned transversely with reference to the position assumed by said reciprocating element and located in proximity to it when it has been passed thru said stuffing box, and with said groove adapted to receive a corresponding ridge located on the side of the packing element adapted to be used in said stuffing box.

6. A stuffing box having a packing chamber adapted to the use of packing elements substantially as shown herein and arranged opposed to one another about the reciprocating element which may be passed thru said stuffing box; a plurality of ridges on the side walls of said packing chamber and positioned thereon transversely to the reciprocating element and located in proximity therewith when the same has been passed thru said stuffing box.

In testimony whereof I affix my signature.

JAMES R. COLE.